(No Model.)

J. CABLE.
SAND BAND FOR VEHICLES.

No. 440,911. Patented Nov. 18, 1890.

Witnesses
A. Ruppert.
E. Cruse

Inventor
John Cable,
by Howard & Howard,
Attorneys.

UNITED STATES PATENT OFFICE.

JOHN CABLE, OF CABLE, MINNESOTA.

SAND-BAND FOR VEHICLES.

SPECIFICATION forming part of Letters Patent No. 440,911, dated November 18, 1890.

Application filed March 7, 1890. Serial No. 343,051. (No model.)

*To all whom it may concern:*

Be it known that I, JOHN CABLE, of Cable, in the county of Sherburne and State of Minnesota, have invented certain new and useful Improvements in Sand-Bands for Vehicle-Axles, of which the following is a specification, reference being had to the accompanying drawings, and to the letters of reference marked thereon.

The object of my invention is to improve the construction of sand-bands for vehicle-axles; and the invention consists in certain peculiarities in the construction, combination, and arrangement of parts, as set forth in the following specification and claim.

Figure 1:
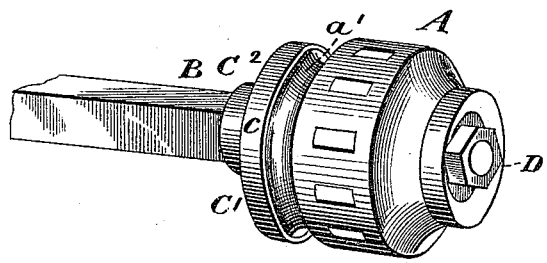
Figure 2:
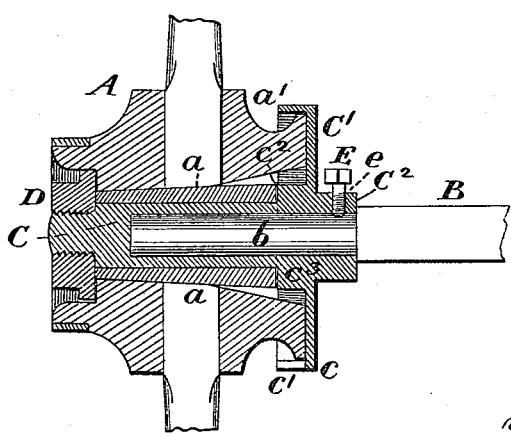
Figure 3:
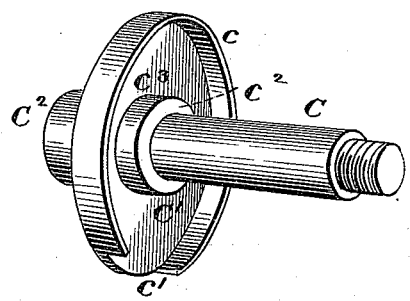
Figure 4:
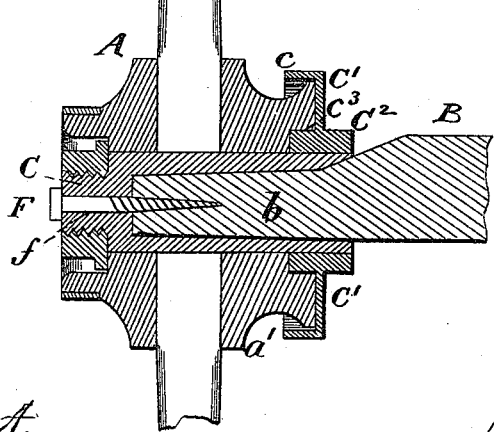

In the drawings, Figure 1 is a perspective view of a hub and a metal axle with my improvement applied. Fig. 2 is a vertical longitudinal section of Fig. 1. Fig. 3 is a perspective view of the sand-band. Fig. 4 shows the invention applied to a wooden axle.

Similar letters of reference indicate similar parts in the respective figures.

A is the hub, having within it the usual metal axle-box $a$. B is the axle having the ordinary bearing-arm $b$.

In Figs. 1 and 2 the axle is represented as made of metal and in Fig. 4 of wood.

Close to its inner end the hub is provided on its periphery with a concentric groove $a'$.

The sand-ring is composed of a long thimble or stem C and a flanged plate or disk C', the latter being of sufficient diameter to inclose the end of the hub. The stem C is hollow the greater part of its length and adapted to fit over the entire length of the bearing-arm $b$ of the axle. The flange $c$ of the plate or disk C' is cut away, as shown at $c'$, for the purpose of forming an exit for the sand or dust. The disk C' and hollow stem C are preferably cast solid, but may be made separate, if desired. The largest diameter of the stem C within the disk is preferably about the same as the exterior diameter of the axle-box $a$; but from a point a short distance within the disk C' it is reduced in diameter in order to enable it to pass through the axle-box $a$, and is screw-threaded at its outer end to receive the usual nut D to retain the hub on the axle.

A shoulder $c^2$ and collar $c^3$ are formed by reducing the diameter of the stem C, and the shoulder abuts against the end of the axle-box $a$. The stem C also projects a short distance beyond the outer surface of the plate C' to form a collar $C^2$, and this collar is provided with a threaded hole $e$ to receive the set-screw E, for the purpose of retaining the stem C on the bearing-arm. The axle-box $a$ does not extend to the end of the hub, and a space is thus left to receive the collar $c^3$ on the stem C.

Referring to Fig. 4, in which the device is applied to a wooden axle, the construction is substantially the same, except that the stem C is larger in proportion to the disk or plate C' than in the device applied to metal axles, and that the hole in the stem to receive the bearing $b$ is tapered. The upper side of the opening in the collar $C^2$ is also reamed out to correspond to the inclined upper surface of the axle.

Instead of using the set-screw E, I form a hole $f$ through the end of the stem C and use a long screw F, which penetrates the wooden bearing-arm some distance.

This sand-band can be applied to old metal axles that have become too much worn at their bearing-arms to be of use, as the stem C can be driven on them with lead or other suitable packing, and will form, practically, a new bearing-arm for such axle.

Having described my invention, I claim—

The combination, with a hub and an axle-box within the hub, a space being left between the end of the axle-box and the inner face of the hub, of a sand-band consisting of a flanged disk inclosing the end of the hub, and a tubular stem having a collar to enter said space, an axle having a bearing-arm to enter and be entirely inclosed in said tubular stem, and a screw to hold the stem and bearing-arm together, substantially as specified.

In testimony whereof I have hereunto set my hand and seal.

JOHN CABLE. [L. S.]

Witnesses:
E. CRUSE,
B. MILLER.